United States Patent Office 2,891,018
Patented June 16, 1959

2,891,018

COMPOSITIONS OF POLYSTYRENE AND NATURAL RUBBER/METHYL METHACRYLATE GRAFT COPOLYMERS AND PROCESS OF PRODUCING SAME

James Joseph Millane, Birmingham, England, assignor to The Distillers Company Limited, Edinburgh, Scotland, a British company No Drawing. Application May 17, 1955
Serial No. 509,110

Claims priority, application Great Britain
June 3, 1954

3 Claims. (Cl. 260—4)

The present invention relates to toughened polystyrene and methods by which it may be made. By toughened polystyrene is meant a resinous composition consisting primarily of polystyrene to which has been added a toughening agent in such proportions that the resultant composition has greater toughness, i.e. shows greater impact strength, a higher maximum elongation before breaking under tension and a greater flexibility than the pure polystyrene.

It is known that the addition of natural rubber to polystyrene yields compositions of improved toughness. However in order to produce compositions having high impact strengths and high elongation at break, it is necessary to add high proportions of the rubber and, consequently, difficulties in the preparation of such compositions are often encountered owing to the limited compatibility of rubber with polystyrene. Moreover, although such compositions may have high impact strengths, their other physical properties may suffer considerably. For instance polystyrene compositions containing high proportions of rubber often show bad moulding characteristics and are often discoloured.

In order to find an improved toughening agent for polystyrene various rubber graft copolymers have been examined. By a rubber graft copolymer is meant a polymeric product produced by carrying out the polymerisation of an unsaturated polymerisable monomeric compound in the presence of dispersed or dissolved rubber whereby it is believed that a proportion of the polymerising monomer combines with the rubber to form polymeric side chains chemically attached to the rubber molecules. The product of this polymerisation reaction, the crude graft polymer, will usually contain also some unchanged natural rubber and some pure polymer derived from that part of the monomer which has polymerised without attack on the rubber. Pure graft polymer may be separated from the mixture if necessary by fractional precipitation from a suitable solvent.

It has now been discovered that, of these rubber graft copolymers, those formed by the polymerisation of methyl methacrylate in the presence of rubber have outstandingly good properties as toughening agents for high molecular weight polystyrenes. Although polymethyl methacrylate itself is not compatible with polystyrene, rubber/methyl methacrylate graft copolymers show surprisingly good compatibility and their addition to polystyrene leads to the production of compositions having unusually high impact strengths. Moreover, addition of these graft copolymers to polystyrene does not so reduce any of the other advantageous properties of polystyrene to such an extent that the resultant compositions are of no general utility.

Accordingly the present invention is for toughened polystyrene which comprises a substantially homogeneous mixture of a polystyrene having an intrinsic viscosity value greater than 10 and a rubber/methyl methacrylate graft copolymer containing a major proportion by weight of rubber.

The polystyrene used is of relatively high molecular weight and should have an intrinsic viscosity value greater than 10. By the intrinsic viscosity value of a sample of polystyrene is meant throughout this specification the intrinsic viscosity value of the polystyrene when measured in toluene solution. The values given in this specification were measured at 25° C. and are expressed as litres/base mol. It is important to use relatively high molecular weight polystyrene because it has been found that, with low molecular weight polystyrene, no unusually marked improvement in toughness is obtained by the addition of the rubber/methyl methacrylate graft copolymers.

Rubber/methyl methacrylate graft copolymers are well-known; see, for instance, Paper 50 of the Third Rubber Technology Conference held in 1954. For use in the process of the present invention they must contain a major proportion by weight of rubber, i.e. the graft copolymer composition must derive more than half its weight from the rubber. The most suitable copolymers contain from 10 to 90 parts by weight of total polymerised methyl methacrylate per 100 parts by weight of rubber in the graft copolymer. Such graft copolymers may be prepared by many various techniques all of which comprise the essential step of polymerising methyl methacrylate in the presence of rubber. This polymerisation may be carried out in aqueous suspension or emulsion when the rubber must be in a finely divided form and is preferably used in the form of a rubber latex. Alternatively the rubber may be dissolved in a suitable solvent to which the methyl methacrylate is added and the solution then subjected to polymerisation conditions to give a solution of the rubber/methyl methacrylate copolymer which may be recovered by any suitable means. In a typical process for the production of a graft copolymer a non-ionic emulsifier was added to an ammonia-stabilised rubber latex and then the monomeric methyl methacrylate was added. A cumene hydroperoxide/polyamine redox catalyst was then added and the mixture was allowed to polymerise at room temperature. The final graft copolymer emulsion was coagulated and washed with water on a mill to give a sheet of copolymer similar in appearance to pale crepe rubber.

The graft copolymer may be incorporated in the polystyrene by any suitable means provided that the mixing procedure is continued until a mixture of substantially homogeneous appearance has been produced. One procedure comprises adding the graft copolymer to the polystyrene while the latter is being masticated on a heated roller mill or in a closed mixer. An alternative procedure comprises mixing an emulsion of polystyrene with a graft copolymer latex formed by polymerising emulsified methyl methacrylate by a suitable catalyst in the presence of a rubber latex. Yet another procedure for the incorporation of the graft copolymer into polystyrene comprises dissolving both the polystyrene and the graft copolymer in a suitable solvent and thereafter removing the solvent from the solution to yield the toughened polystyrene. Alternatively the toughened polystyrene can be prepared by dispersing finely divided graft copolymer in monomeric styrene and then polymerising the latter under such conditions that the molecular weight of the polystyrene formed is sufficiently high. When the toughened polystyrene is produced by such a process it is often advantageous to mill the resultant product to improve its physical characteristics.

The proportion of graft copolymer to polystyrene in the toughened polystyrene compositions of the present invention may be varied considerably depending upon the use to which the composition is to be put. Generally speaking, however, the most useful compositions contain 5 to 30 parts by weight of graft copolymer for every 100 parts by weight of polystyrene present.

The following examples illustrate the production of toughened polystyrene by the process of the present invention, the parts given being by weight. In all cases the toughened polystyrene was prepared by milling the graft copolymer with the polystyrene on a roller mill at 160° C. until a substantially homogeneous product had been obtained. (This required about 10 minutes.) The impact strength values given for the products were measured on compression moulded samples using a Hounsfield pendulum tester (Charpy-type) by the technique described in the Journal of Applied Chemistry, 1952, 2, pp. 501–510, the units being ergs/cm.$\times 10^{-6}$. Elongation at break and tensile strength measurements were made using a Hounsfield tensometer.

*Example 1*

Two samples of toughened polystyrene were prepared by milling 20 parts of a high molecular weight polystyrene having an intrinsic viscosity value of 12 with different proportions of a substantially pure rubber/methyl methacrylate graft copolymer in which the rubber: methyl methacrylate weight ratio was 85:15. The resultant compositions had the physical properties shown in the following table. For the sake of comparison a similar composition was prepared containing 3.5 parts of pure rubber per 20 parts of polystyrene and also the physical tests were carried out on the pure polystyrene.

| Weight of copolymer | 4.12 parts | 3.5 parts | nil (pure polystyrene) | Pure rubber addition only |
|---|---|---|---|---|
| Impact strength, ergs/cm. $\times 10^{-6}$ | 8.9 | 9.6 | 2.8 | 4.5 |
| Tensile strength, lbs. per sq. inch | 4,290 | 4,790 | 7,620 | 5,400 |
| Elongation at break, percent | 8.9 | 7.2 | 5.6 | 8 |

The addition of 3.5 parts of polymethyl methacrylate to the polystyrene gave a composition having an impact strength value of only 0.93, i.e. considerably less than pure polystyrene.

The above figures show that great increases in the impact strength of polystyrene can be obtained by the addition of a rubber/methyl methacrylate graft copolymer as compared with the addition of similar proportions of pure rubber. They also show that the advantageous impact strengths are obtained without undue deterioration of other physical properties of the resultant toughened polystyrene composition.

The necessity of employing a high molecular weight polystyrene in the process of the present invention is illustrated by repeating the above procedure on a low molecular weight sample of polystyrene having an intrinsic viscosity of 7.5. The pure polystyrene had an impact strength of 1.5 and the addition of 3.5 parts of the rubber/methyl methacrylate copolymer to 20 parts of the polystyrene only increased this value to 1.9 while the addition of 4.12 parts only increased the value to 2.1.

*Example 2*

A crude rubber/methyl methacrylate graft copolymer in which approximately half the material was copolymer, the remainder being a mixture of rubber and polymethyl methacrylate, was prepared by polymerising a mixture comprising a rubber latex consisting of 70 parts of rubber, and 30 parts of monomeric methyl methacrylate, and isolating the polymeric product by precipitation, washing and drying. The resultant product was added by milling to two portions of 20 parts of a sample of the high molecular weight polystyrene used in Example 1 in amounts of 3.5 and 5.0 parts respectively. The resultant two products had impact strength values of 4.7 and 7.2 respectively.

By way of comparison 5 parts of a mechanically prepared mixture of rubber and polymethyl methacrylate, mixed in the ratio by weight of 70:30 were compounded with 20 parts of the same polystyrene sample. This mixture had the same impact strength as the pure polystyrene. A similar comparison composition, in which the components were mixed as aqueous latices, had an impact strength value of 3.0.

*Example 3*

A crude rubber/methyl methacrylate graft copolymer containing approximately 50% graft copolymer was prepared from an 80/20 rubber/methyl methacrylate mixture. The addition of 4.4 parts of this crude graft copolymer to 20 part portions of the same polystyrene employed in Example 1 gave a composition having an impact strength value of 6.1.

*Example 4*

A crude rubber/methyl methacrylate graft copolymer containing approximately 50% graft copolymer was prepared from a 60/40 rubber/methyl methacrylate mixture. The addition of 5.8 parts of this crude graft copolymer to 20 parts of the same polystyrene employed in Example 1 gave a composition having an impact strength value of 5.05.

All the above examples illustrate the use of rubber/methyl methacrylate graft copolymers in the production of toughened polystyrene compositions. The specific nature of these graft copolymers in their power to reinforce polystyrene is illustrated by the failure of pure rubber/styrene graft copolymers to produce useful toughening. Two rubber/styrene graft copolymers were prepared by polymersing mixtures containing weight proportions of rubber to styrene of 50/50 and 72/28. 7.0 parts of the former and 4.8 parts of the latter were mixed with two 20 part portions of the same polystyrene as used in the above examples to give two polystyrene compositions having impact strength values of 3.9 and 4.4 respectively.

I claim:

1. Toughened polystyrene comprising a substantially homogeneous mixture of a polystyrene having an intrinsic viscosity value greater than 10 litres/base mol when measured at 25° C. and 5 to 30 parts by weight of a rubber/methyl methacrylate graft copolymer for every 100 parts by weight of polystyrene, said copolymer containing a major proportion by weight of natural rubber.

2. Toughened polystyrene as claimed in claim 1 wherein the graft copolymer contains from 10 to 90 parts by weight of total polymerised methyl methacrylate per 100 parts by weight of the natural rubber.

3. A process for the production of a toughened polystyrene which comprises incorporating a polystyrene having an intrinsic viscosity value greater than 10 litres/base mol when measured at 25° C. with 5 to 30 parts by weight of a rubber/methyl methacrylate graft copolymer for every 100 parts by weight of polystyrene, said copolymer containing a major proportion by weight of natural rubber, on a roller mill at about 160° C.

References Cited in the file of this patent

UNITED STATES PATENTS

| 2,422,550 | Jacobson | June 17, 1947 |
| 2,755,270 | Hayes | July 17, 1956 |

OTHER REFERENCES

Bacon et al.: "The Incorporation of Polymeric Resins into Natural Rubber," page 529.

Paper 50, "Third Rubber Technology Conference" (1954).